US012761432B2

(12) United States Patent
Shao et al.

(10) Patent No.: US 12,761,432 B2
(45) Date of Patent: Oct. 13, 2026

(54) OPTICAL COUPLING ADAPTER FOR FIBER-TO-CHIP INTEGRATION

(71) Applicant: Taiwan Semiconductor Manufacturing Co., Ltd., Hsinchu (TW)

(72) Inventors: Tung-Liang Shao, Hsinchu (TW); Yu-Sheng Huang, Hemei Township (TW); Chen-Hua Yu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 413 days.

(21) Appl. No.: 18/323,534

(22) Filed: May 25, 2023

(65) Prior Publication Data

US 2024/0272389 A1 Aug. 15, 2024

Related U.S. Application Data

(60) Provisional application No. 63/485,044, filed on Feb. 15, 2023.

(51) Int. Cl.
*G02B 6/14* (2006.01)
*G02B 6/42* (2006.01)

(52) U.S. Cl.
CPC ........... *G02B 6/428* (2013.01); *G02B 6/4214* (2013.01); *G02B 6/4243* (2013.01); *G02B 6/4238* (2013.01)

(58) Field of Classification Search
CPC ........ G02B 6/14
USPC ........ 385/14
See application file for complete search history.

(56) References Cited

U.S. PATENT DOCUMENTS

| | | | | |
|---|---|---|---|---|
| 11,592,618 | B2 * | 2/2023 | Hsia | G02B 6/13 |
| 2016/0131842 | A1 * | 5/2016 | Mahgerefteh | G02B 6/124 385/11 |
| 2016/0327749 | A1 * | 11/2016 | Jiang | C23C 14/584 |
| 2017/0146751 | A1 * | 5/2017 | Sutherland | G02B 6/4214 |
| 2019/0265415 | A1 * | 8/2019 | Psaila | G02B 6/29331 |
| 2020/0241207 | A1 * | 7/2020 | Razdan | G02B 6/30 |
| 2020/0241220 | A1 * | 7/2020 | Evans | G02B 6/13 |
| 2021/0271037 | A1 * | 9/2021 | Brusberg | G02B 6/4228 |
| 2021/0341691 | A1 * | 11/2021 | Sutherland | G02B 6/424 |
| 2022/0128767 | A1 * | 4/2022 | Evans | G02B 6/3882 |
| 2022/0155526 | A1 * | 5/2022 | Dong | G02B 6/421 |
| 2022/0334331 | A1 * | 10/2022 | Sutherland | G02B 6/4482 |
| 2022/0373742 | A1 * | 11/2022 | Kim | G02B 6/30 |
| 2023/0030105 | A1 * | 2/2023 | Aalto | G02B 6/1228 |
| 2023/0350131 | A1 * | 11/2023 | Tanaka | G02B 6/136 |
| 2024/0027706 | A1 * | 1/2024 | Tadayon | G02B 6/4214 |

FOREIGN PATENT DOCUMENTS

| | | |
|---|---|---|
| KR | 20210154086 A | 12/2021 |

* cited by examiner

*Primary Examiner* — Kaveh C Kianni
(74) *Attorney, Agent, or Firm* — Slater Matsil, LLP

(57) ABSTRACT

A method includes forming an optical engine including a photonic integrated circuit die, wherein the photonic integrated circuit die includes an optical component, forming an adapter comprising a laser written waveguide, and assembling the optical engine, the adapter, and an optical fiber as a package. The optical fiber is optically coupled to the optical component through the laser written waveguide in the adapter.

20 Claims, 16 Drawing Sheets

OPTICAL COUPLING ADAPTER FOR FIBER-TO-CHIP INTEGRATION

PRIORITY CLAIM AND CROSS-REFERENCE

This application claims the benefit of the following provisionally filed U.S. Patent application: Application No. 63/485,044, filed on Feb. 15, 2023, and entitled "Optical Coupling Adapter for Fiber-to-Chip Integration," which application is hereby incorporated herein by reference.

BACKGROUND

As the bandwidth requirement grows rapidly for high-performance computing systems, high-speed optical Input/Output (I/O) modules have been used increasingly. The optical I/O modules are often connected to light sources (laser) as the circuit driving sources.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
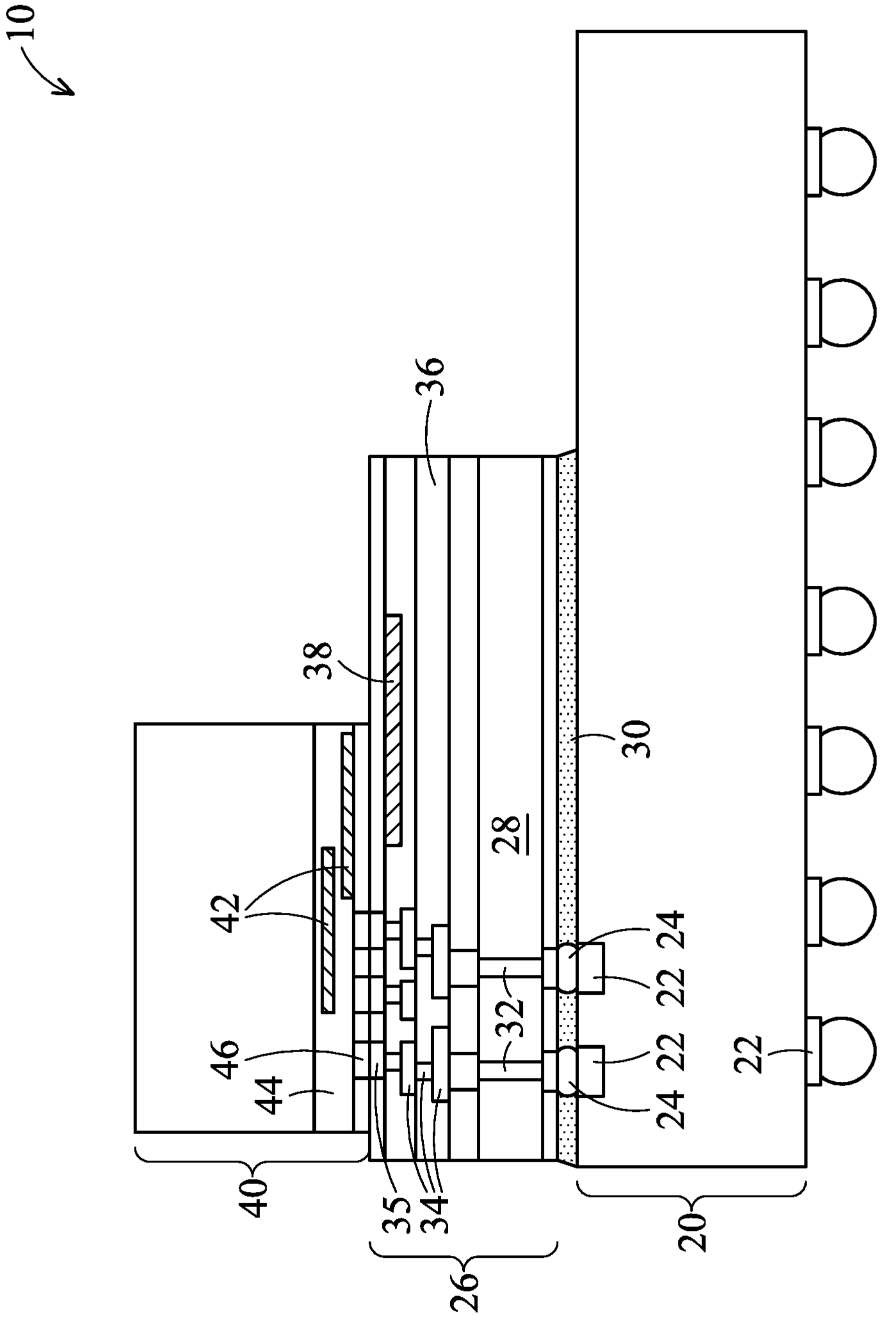
FIGS. 1 through 5 illustrate the cross-sectional views of intermediate stages in the integration of a photonic package through an adapter in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "underlying," "below," "lower," "overlying," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A photonic package including an adapter for integrating an optical fiber(s) with an optical engine and the method of forming the same are provided. The adapter includes a laser written waveguide(s) therein, which are formed through laser writing. The laser written waveguides optically and signally connect an optical fiber(s) to optical components such as waveguides and/or edge couplers. Embodiments discussed herein are to provide examples to enable making or using the subject matter of this disclosure, and a person having ordinary skill in the art will readily understand modifications that can be made while remaining within contemplated scopes of different embodiments. Throughout the various views and illustrative embodiments, like reference numbers are used to designate like elements. Although method embodiments may be discussed as being performed in a particular order, other method embodiments may be performed in any logical order.

FIGS. 1 through 5 illustrate the cross-sectional views of intermediate stages in the integration of an optical fiber with an optical engine in accordance with some embodiments of the present disclosure. The corresponding processes are also reflected schematically in the process flow shown in FIG. 17. In the subsequent discussion, the terms "optical signal," "light," and "laser" may be used interchangeably.

Figure 17:
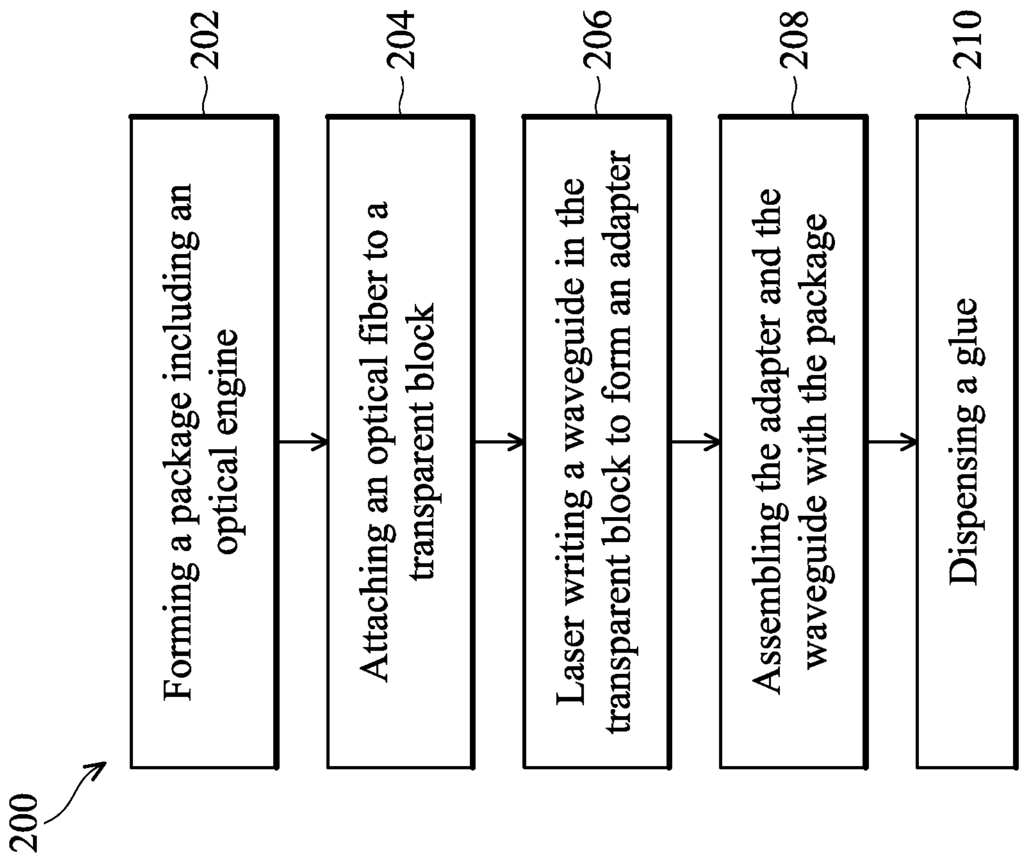
FIG. 17 illustrates a process flow in the integration of a photonic package in accordance with some embodiments.

Referring to FIG. 1, package 10 is formed, which includes an optical engine therein. The respective process is illustrated as process 202 in the process flow 200 as shown in FIG. 17. In accordance with some embodiments, package component 20 is provided for attaching other components thereon. Package component 20 may include a package substrate, a printed circuit board, a package including other package components such as device dies, or the like. Electrical conductive features 22 are formed on the opposite sides of package component 20, and are connected through the conductive paths (such as metal lines, vias, or the like, not shown) inside package component 20.

In accordance with some embodiments, package component 26 is placed over and bonded to package component 20. The bonding may be performed through solder bonding, metal-to-metal direct bonding, dielectric-to-dielectric bonding, and/or the like. For example, solder regions 24 may be used for bonding package component 26 to package component 20. Underfill 30 may be dispensed in the gap between package component 20 and package component 26.

In accordance with some embodiments, package component 26 comprises an interposer (and hence may alternatively be referred to as interposer 26 hereinafter), which may include substrate 28 and through-vias 32 in the substrate 28. Substrate 28 may be a semiconductor substrate such as a silicon substrate or a dielectric substrate. Conductive features 34 such as metal lines and vias may be formed on the top side and the bottom side of substrate 28. Through-vias 32 electrically connect the electrically conductive features 34 on the top side of substrate 28 to the electrically conductive features on the bottom side of substrate 28. Furthermore, package component 26 may be used to electrically interconnect package component 20 and the overlying optical engine 40. Dielectric layers 36 may be formed over substrate 28. In accordance with some embodiments, dielectric layers 36 may be formed of or comprise a transparent dielectric material(s) such as silicon oxide, silicon oxycarbide, silicon oxy-carbo-nitride, and/or the like.

In accordance with some embodiments, in dielectric layers 36, waveguides 38 may be formed. In accordance with some embodiments, waveguides 38 are formed of silicon. In accordance with alternative embodiments, waveguides 38 are formed of silicon nitride, and hence are referred to as nitride waveguides hereinafter. There may be, or may not be, other optical components such as silicon waveguides, grating couplers, edge couplers, and/or the like formed in dielectric layers 36, which optical components allow optical signals to be transmitted or processed.

When optical components are formed in package component 26, package component 26 may include an optical path for optically coupling the optical signals from the subsequently integrated optical fibers into optical engine 40, or optically coupling the optical signals from the optical engine 40 into the subsequently integrated optical fibers. In accordance with alternative embodiments, package component 26 is used for the electrical interconnection between optical engine 40 and package component 20, and no optical components are formed in package component 26. For example, when edge couplers are formed in optical engine 40, the optical signal may be inter-coupled directly between the optical engine 40 and the optical fibers, without going through package component 26.

In accordance with some embodiments, optical engine 40 is bonded over, and is electrically coupled to, package component 26. The bonding may include hybrid bonding, which includes both of metal-to-metal direct bonding and dielectric-to-dielectric bonding. For example, the bond pads 46 in optical engine 40 are bonded to the bond pads 35 in package component 26. Furthermore, a surface dielectric layer in the dielectric layers 44 in optical engine 40 is bonded to the surface dielectric layer in the dielectric layers 36 in package component 26 through fusion bonding, with Si—O—Si bonds being generated.

In accordance with some embodiments, optical engine 40 comprises a photonic Integrated circuit (PIC) die and an Electronic Integrated circuit (EIC) die bonding to the PIC die, which are not illustrated separately. The bonding between the EIC die and the PIC die may also include metal-to-metal direct bonding, solder bonding, or hybrid bonding.

In accordance with some embodiments, the PIC die may include optical components including, and not limited to, silicon waveguides, (silicon) nitride waveguides, grating couplers, photodetectors, modulators, edge couplers, and/or the like. The PIC die may include a silicon substrate, on which the optical components are formed.

In accordance with some embodiments, the EIC die may include integrated circuits for interfacing with the PIC, such as the circuits for controlling the operation of the PIC. For example, the EIC may include controllers, drivers, amplifiers, the like, or combinations thereof. the EIC may also include a CPU. In accordance with some embodiments, the EIC includes the circuits for processing electrical signals received from the PIC. The EIC may also control high-frequency signaling of the PIC according to electrical signals (digital or analog) received from another device or die, in accordance with some embodiments. In accordance with some embodiments, the EIC may include a circuit that provides Serializer/Deserializer (SerDes) functionality. In this manner, the EIC may act as a part of an I/O interface between optical signals and electrical signals.

In accordance with some embodiments, the PIC may include dielectric layers 44, which may be light transparent. Waveguides 42 are formed in dielectric layers 44. Waveguides 42 may include silicon waveguides and/or (silicon) nitride waveguides. Waveguides 42 are used for transporting optical signals in to the components in optical engine 40 for further processing such as optical-to-electrical signal conversion and/or electrical-to-optical signal conversion.

Figure 2:
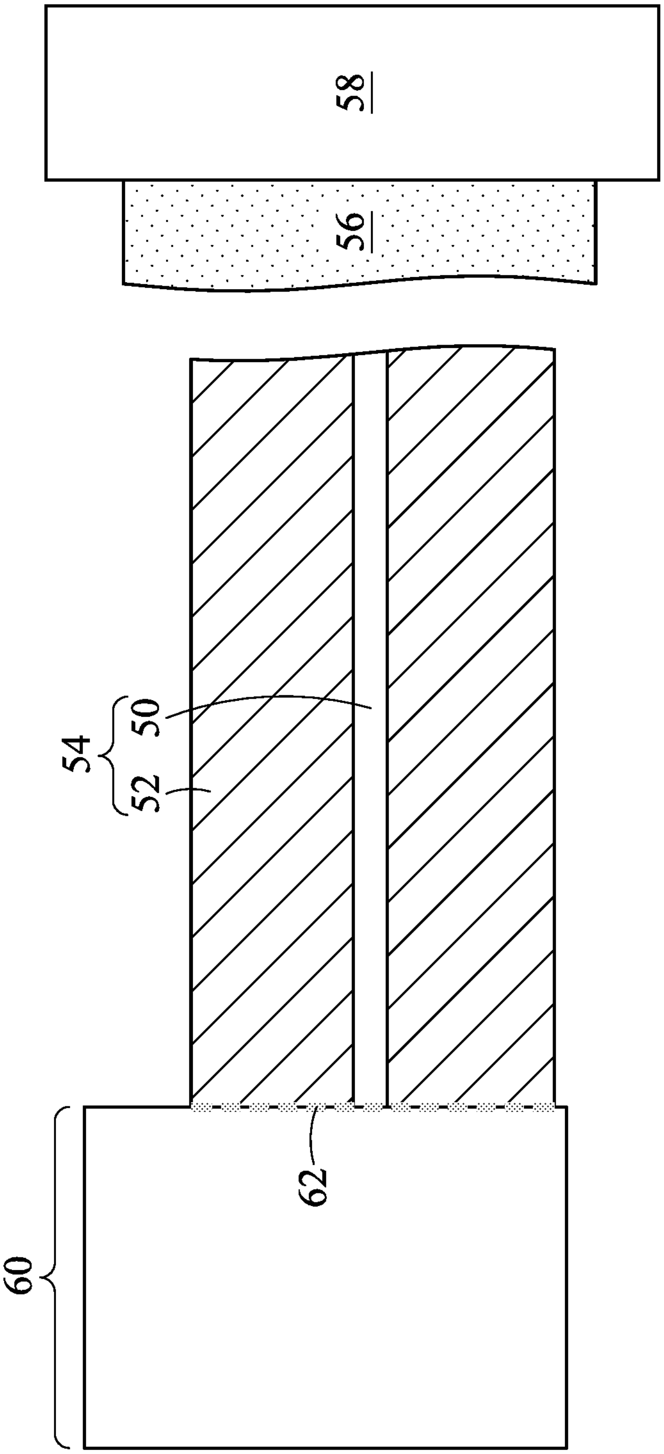

FIG. 2 illustrates the attachment of an optical fiber(s) 54 to transparent block 60. The respective process is illustrated as process 204 in the process flow 200 as shown in FIG. 17. It is appreciated that although one optical fiber 54 is illustrated in the cross-sectional view, there may be a single optical fiber 54 or a plurality of optical fibers 54 attached to transparent block 60. When a plurality of optical fibers 54 are adopted, plurality of optical fibers 54 may be placed in parallel. In accordance with some embodiments, optical fiber 54 has one end attached to Mechanical Transfer (MT) ferrule 58, for example, through coating 56. Optical fiber 54 may include core 50, which is used for transporting laser, and cladding layer 52 surrounding core 50. There may also be (or may not be) a protection layer (not shown) further surrounding cladding layer 52.

In accordance with some embodiments, transparent block 60 is formed of or comprises a material that is transparent to laser. For example, transparent block 60 may be formed of or comprises a glass, and may be formed of or comprises borate, a soda lime silicate, a fluorozirconate glass, or the like. Transparent block 60 may also comprise a silicon oxide-based material such as high-silica.

In accordance with some embodiments, optical fiber 54 may be attached to transparent block 60 through bonding. For example, the cladding layer 52 of optical fiber 54 may be silicon oxide based, and may be bonded to transparent block 60 through a laser bonding process. In the laser bonding process, the cladding layer 52 is put into contact with transparent block 60. A laser beam may be projected on the joining portions of cladding layer 52 and transparent block 60 to heat these portions locally. As a result, bonds are formed between cladding layer 52 and transparent block 60 to bond them together. In accordance with some embodiments in which cladding layer 52 and transparent block 60 are silicon and/or oxide based, the bonding includes fusion bonding, with Si—O—Si bonds being formed.

The core 50 may be in physical contact with (but not bonded to) transparent block 60, or may be spaced apart slightly from transparent block 60. Alternatively, the core 50 may be bonded to transparent block 60 through welding. In accordance with these embodiments, since core 50 may melt locally, process is carefully controlled to prevent the damage of core 50.

In accordance with alternative embodiments, instead of bonding, an optical glue (which is transparent to laser) is used to attach optical fiber 54 to transparent block 60. In FIG. 2, interface 62 is illustrated to represent the attachment means, which may be either the welding interface between optical fiber 54 and transparent block 60, or may be the optical glue that attaches optical fiber 54 to transparent block 60.

Figure 3:
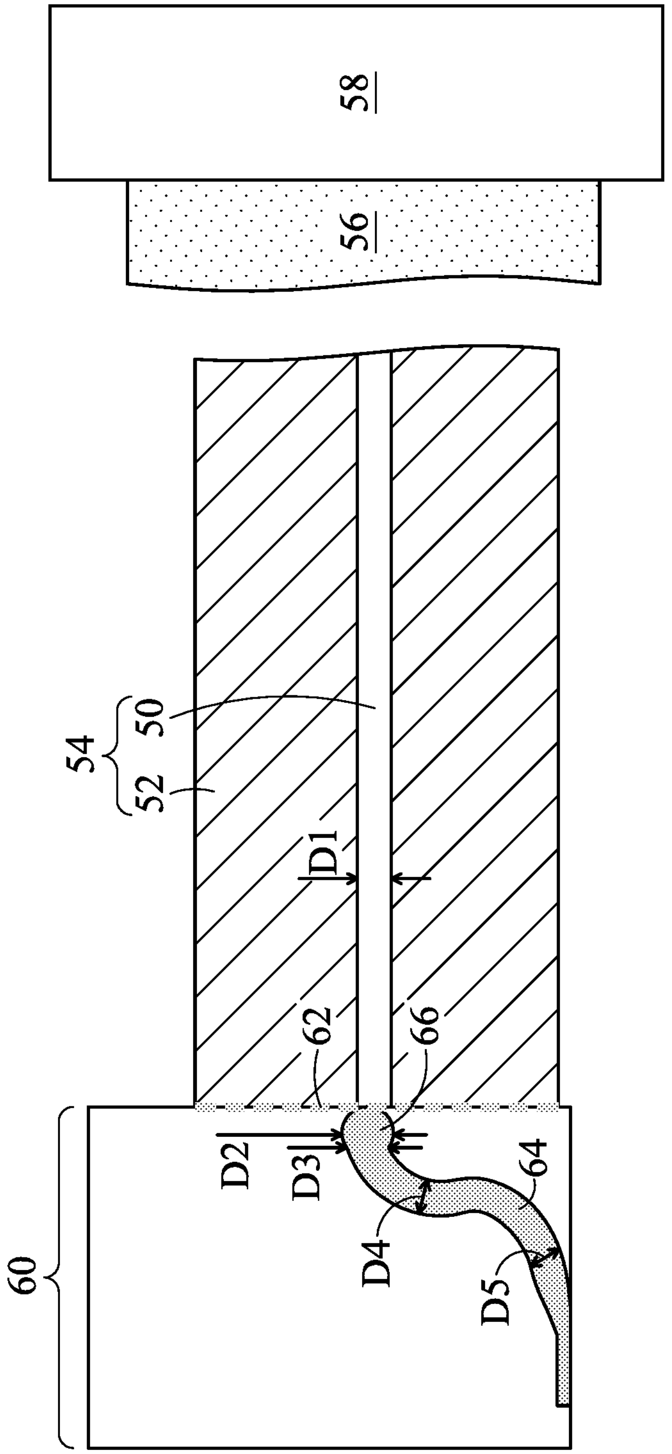

FIG. 3 illustrates the laser writing of waveguide 64 in transparent block 60. The respective process is illustrated as process 206 in the process flow 200 as shown in FIG. 17. In accordance with some embodiments, the laser writing is performed through Femtosecond Laser Direct Writing (FLDW). A laser beam is used, and is focused on and projected onto selected regions in transparent block 60, which is referred to as laser writing of the selected regions. The laser writing results in the properties of the written portions of the transparent block 60 to change. For example, the refractive index of the written portions may be increased to be higher than the unwritten portions. As a result, when the written portions are continuous and form a path, the written portions may act as a waveguide, which is referred to as laser written waveguide 64 or waveguide 64 hereinafter.

In accordance with some embodiments, as shown in FIGS. 2 and 3, the laser writing is performed after the optical fiber 54 is attached to transparent block 60. This allows the accurate alignment of the laser written waveguide 64 to the core 50 in optical fiber 54. In accordance with alternative embodiments, the laser writing is performed before the optical fiber 54 is attached to transparent block 60. Accordingly, in the attachment of optical fiber 54 to transparent block 60, active alignment is performed, so that the core 50 is accurately aligned to the laser written waveguide 64.

In accordance with some embodiments, lens 66 is also formed in transparent block 60 by the laser writing, and is alternatively referred to as laser written lens 66 hereinafter. Lens 66 is joined to waveguide 64. Lens 66 may extend to the illustrated right edge of transparent block 60, or may be spaced apart slightly from the illustrated right edge of transparent block 60 by an unwritten portion of the transparent block 60. The illustrated left end of waveguide 64 may reach, and may terminate at, the bottom surface of transparent block 60. Lens 66 has the function of focusing the laser beam received from one of the core 50 and laser written waveguide 64, and projects the focused laser beam to the other one of the core 50 and laser written waveguide 64.

In accordance with some embodiments, the core 50 of optical fiber 54 has diameter D1. The diameter D2 of lens 66 may be greater than the diameter D1. The connecting end of waveguide 64 has dimension D3, with the connecting end being connected to lens 66. Diameter D3 is smaller than diameter D2, and may be equal to or smaller than diameter D1. Waveguide 64 may include a portion having a uniform dimension (width or diameter, depending on the cross-sectional shape). For example, the dimensions D3 and D4, which are the dimensions of a portion of waveguide 64, may be equal to each other. Waveguide 64 may also include a portion having gradually reduced dimensions. For example, dimension D5 may be smaller than dimension D4, and the portion of waveguide 64 between where diameters D4 and D5 are measured may have gradually reduced (variable) dimensions.

In accordance with some embodiments, waveguide 64 may have a round cross-sectional view (when viewed facing the direction of laser traveling). Correspondingly, the above-discussed dimensions D3, D4, D5, and the like may be diameters. In accordance with other embodiments, waveguide 64 may have other cross-sectional shapes such as rectangular shapes.

Core 50 is aligned to an intermediate level of the transparent block 60, which intermediate level is between the top surface and the bottom surface, and may be at or close to the middle height, of transparent block 60. In accordance with some embodiments, the laser is redirected by waveguide 64 to the bottom of the transparent block 60. Accordingly, waveguide 64 is continuously curved, and extends from the intermediate level to the bottom of transparent block 60. Correspondingly, waveguide 64 is referred to as having a 3D structure.

Transparent block 60, with the waveguide 64 and lens 66 therein, acts as an adapter (or alternatively referred to as a converter), which converts the sizes and the pitches of optical fibers 54 to the sizes and the pitches of the waveguides and/or edge couplers of optical engines 40. For example, the sizes and the pitches of optical fibers 54 may be larger than the sizes and the pitches of the waveguides and/or edge couplers. It thus may be difficult to input the optical signal from the optical fibers 54 directly into the optical engines, and adapter 60 may be used for the size and pitch conversion. Throughout the description, transparent block 60 is also referred to as adapter 60 or converter 60.

Figure 4:
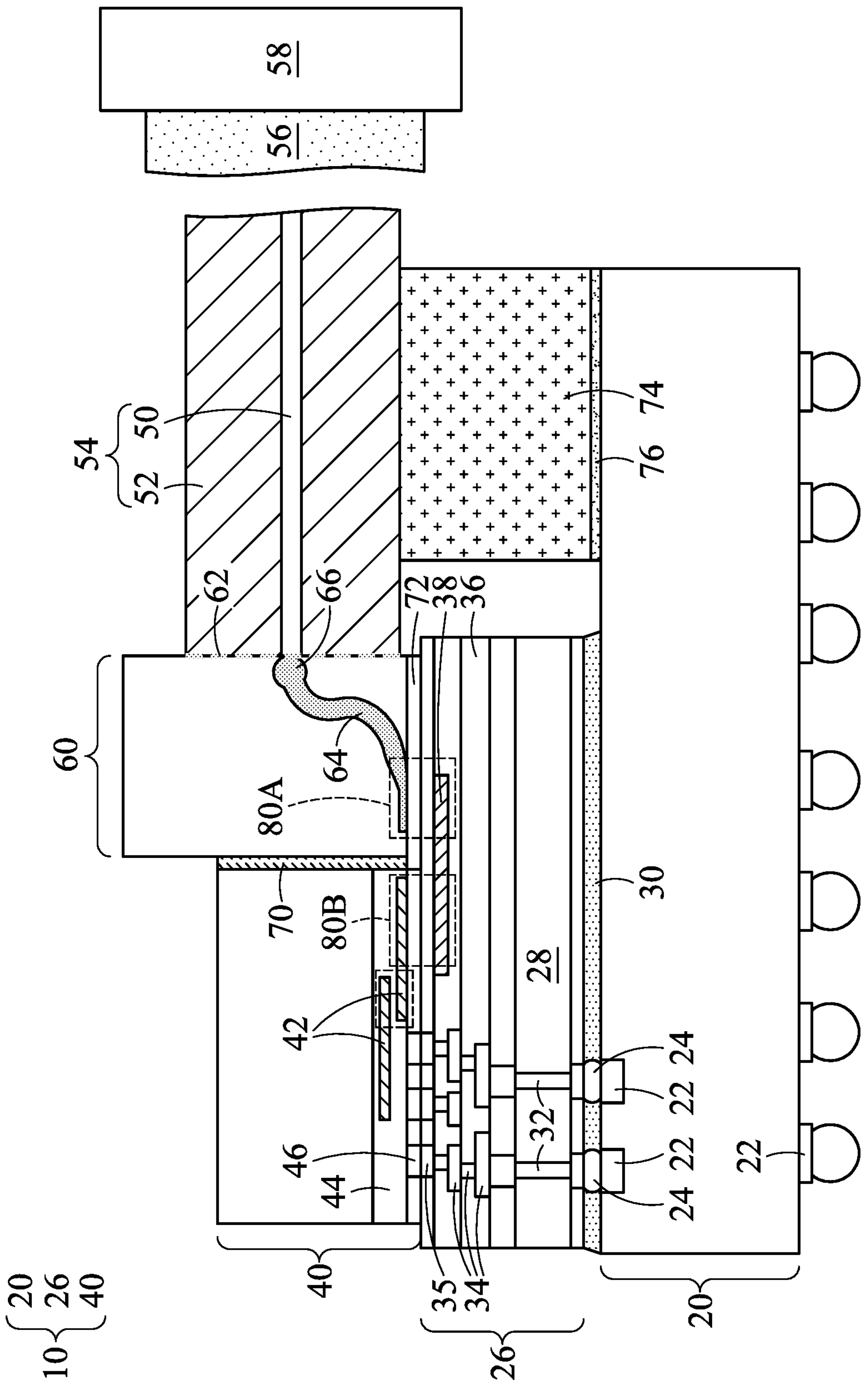

FIG. 4 illustrates the assembly of adapter 60 and optical fiber 54 to package 10. The respective process is illustrated as process 208 in the process flow 200 as shown in FIG. 17. In accordance with some embodiments, adapter 60 is attached to optical engine 40 through an adhesive 70. In the illustrated embodiment in which the light is coupled to optical engine 40 through interposer 26, adhesive 70 may be an optical glue that is transparent to light, or may be an opaque glue. In accordance with alternative embodiments (FIG. 9, for example) in which light is coupled directly from adapter 60 into optical engine 40, adhesive 70 is an optical glue that is transparent to light.

In accordance with some embodiments, adapter 60 is also attached to interposer 26 through fusion bonding, with bonds (such as Si—O—Si bonds) being formed between adapter 60 and interposer 26. Accordingly, there is no gap between adapter 60 and interposer 26. In accordance with alternative embodiments, adapter 60 is also attached to interposer 26 through an adhesive 72. In the illustrated embodiment in which the light is coupled to optical engine through interposer 26, adhesive 72 is an optical glue. In accordance with alternative embodiments in which light is coupled directly from adapter 60 into optical engine 40, adhesive 72 may be an optical glue or may be opaque. When the adhesive 72 is used, the thickness of adhesive 72 is kept to be small, for example, smaller than about 5 μm, and may be in the range between about 0.5 μm and about 5 μm.

In accordance with some embodiments, supporter 74 is attached underlying a portion of optical fiber 54 to support optical fiber 54. Supporter 74 may have a groove, with optical fiber 54 being partially in the groove to provide foothold for optical fiber 54, and to prevent optical fiber 54 from moving. When there are a plurality of optical fibers 54, there are also a plurality of grooves, each for placing one of the optical fibers 54 therein.

Supporter 74 may be formed of or comprises an elastic material such as silicone, rubber, or the like. Alternatively, supporter 74 may be formed of or comprises a hard material such as a ceramic, a glass, a polymer, a metal, a metal alloy, or the like. The height of supporter 74 is selected, so that optical fiber 54 may be kept straight without being bent. Supporter 74 may be attached to package component 20 through adhesive 76. Adhesive 76 may also have the function of eliminating the impact of the warpage of package component 26.

Figure 5:
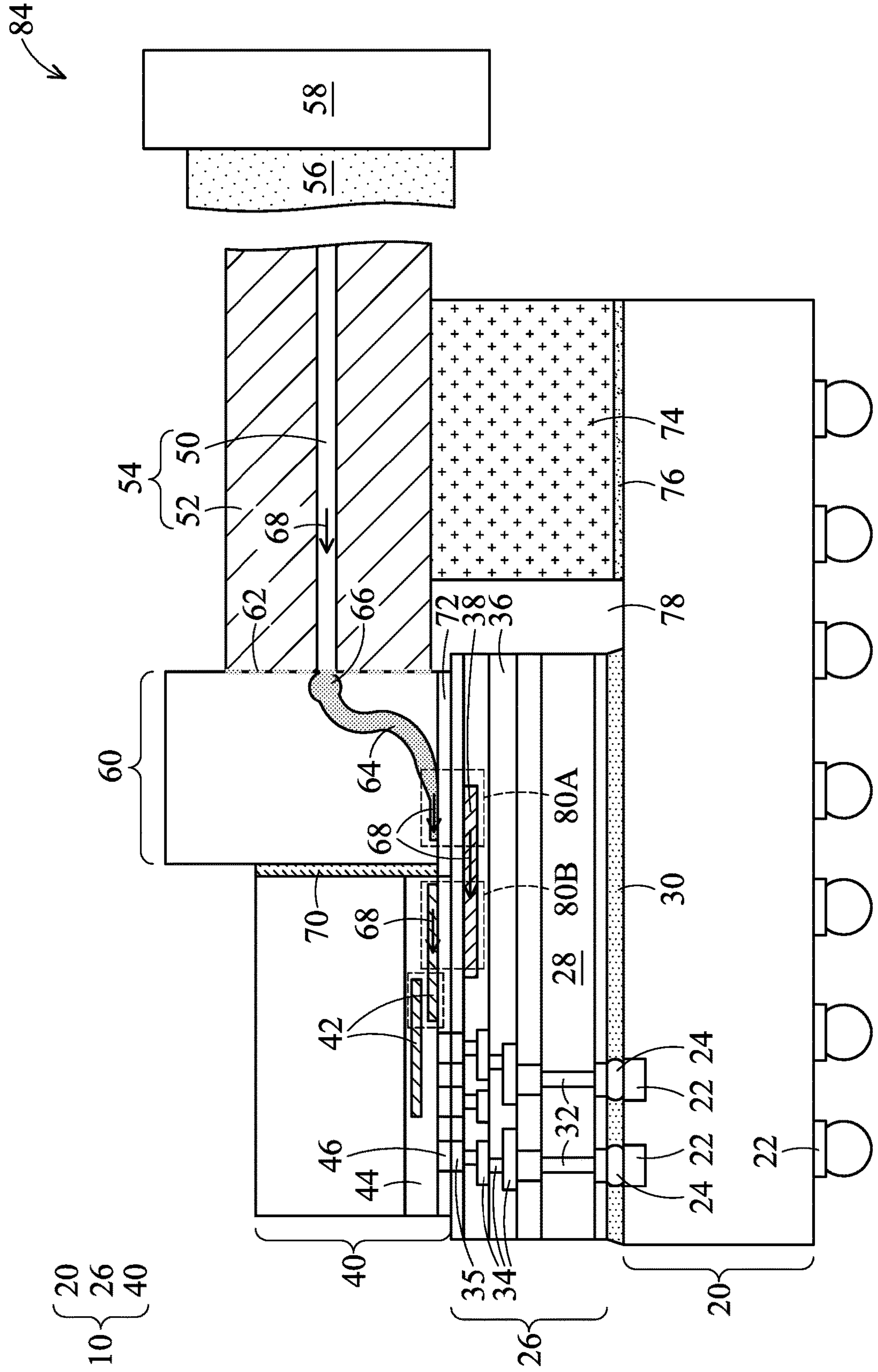

FIG. 5 illustrates the dispensing and the curing of buffer glue 78, which is used to join and fix optical fiber 54, supporter 74, and interposer 26. The respective process is illustrated as process 210 in the process flow 200 as shown in FIG. 17. Optical package 84 is thus formed.

The operation of optical package 84 is discussed briefly as follows. In the following discussed example, it is assumed that the optical signal (such as laser) is input from the side of MT ferrule 58 and is transported to optical engine 40. Arrows 68 represents the corresponding laser/light carrying the optical signal. It is appreciated that the optical signal may also be projected by the optical engine 40 and output to optical fiber 54.

Light 68 enters into, and is focused by, lens 66, and enters waveguide 64, which may have a smaller diameter than core 50. In accordance with some embodiments, the waveguide 64 is downwardly curved, and redirects light 68 to the bottom of adapter 60. The illustrated bottom end of waveguide 64 includes a portion that extends in the horizontal direction (parallel to the bottom of adapter 60), which portion of the waveguide 64 is in the region 80A as marked using a dashed rectangular frame. The end portion of waveguide 64 in the region 80A may have a uniform height (thickness measured in vertical direction), and may have a length great enough for evanescent coupling. For example, the length of the end portion extending in the horizontal direction may be greater than about 3 mm, and may be in the range between about 3 mm and about 7 mm.

Waveguide 38 in interposer 26 also includes a portion (the illustrated right portion) in region 80A and directly under and overlapped by the end portion of waveguide 64. Also, the vertical distance between waveguides 38 and 64 is small enough, so that evanescent coupling occurs between waveguides 38 and 64, and the light is coupled into waveguide 38.

Figure 6:
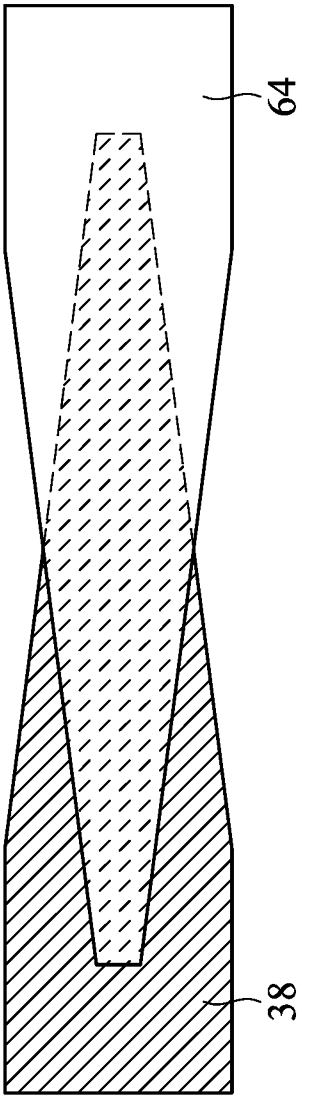
FIGS. 6 and 7 illustrate the top views of waveguides that are optically inter-coupled through evanescent coupling in accordance with some embodiments.

FIG. 6 illustrates a top view of the overlapped portions of waveguides 38 and 64 in accordance with some embodiments. In the top view, either one, or both of, waveguides 38 and 64 may be tapered where waveguide 64 overlaps waveguide 38, so that the evanescent coupling efficiency is increased. In accordance with alternative embodiments, the portion of waveguide 64 overlapping waveguide 38 may have a uniform width in the top view, and/or the portion of waveguide 38 overlapped by waveguide 64 may have a uniform width.

Referring back to FIG. 5, the waveguide 38 in interposer 26 also includes a portion (the illustrated left portion) in region 80B, which portion is directly under and overlapped by an end portion of waveguide 42 (in the PIC) in optical engine 40. Also, the vertical distance between waveguides 38 and 42 is small enough, so that evanescent coupling occurs between waveguides 38 and 42, and light 68 is coupled into waveguide 42.

Figure 7:
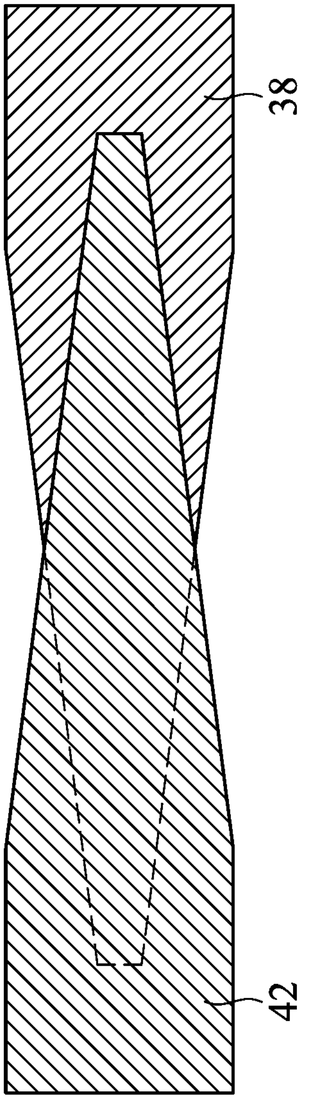

FIG. 7 illustrates a top view of the overlapped portions of waveguides 38 and 42 in accordance with some embodiments. In the top view, either one, or both of, waveguides 38 and 42 may be tapered where waveguide 42 overlaps waveguide 38, so that the coupling efficiency is increased. In accordance with alternative embodiments, the portion of waveguide 42 overlapping waveguide 38 may have a uniform width in the top view, and/or the portion of waveguide 38 overlapped by waveguide 42 may have a uniform width.

Referring back to FIG. 5 again, in accordance with some embodiments, the light 68 traveling in waveguide 64 is coupled into waveguide 38 through evanescent coupling, and then is further coupled into waveguide 42 through evanescent coupling. Accordingly, light 68, which is input from optical fiber 54, is coupled into optical engine 40 for processing. Conversely, a light output from optical engine 40 may also go through interposer 26 and adapter 60, and is transported to optical fiber 54.

FIGS. 8 through 14 illustrate the cross-sectional views of optical packages 84 in accordance with alternative embodiments of the present disclosure. Unless specified otherwise, the materials, the structures, and the formation processes of the components in these embodiments are essentially the same as the like components denoted by like reference numerals in the preceding embodiments. The details regarding the materials, the structures, and the formation processes of the components shown in FIGS. 8 through 14 may thus be found in the discussion of the preceding embodiments.

Figure 8:
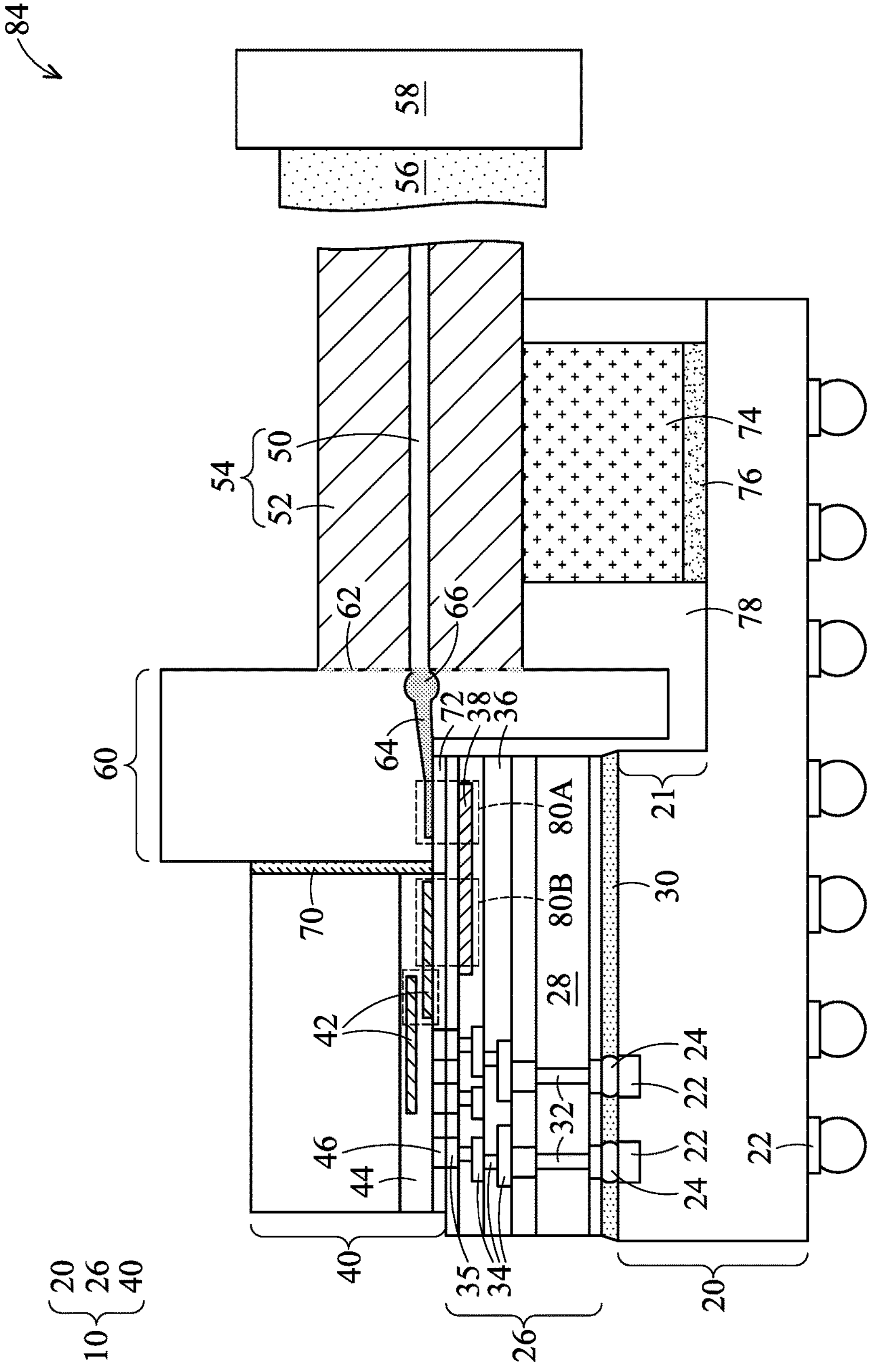
FIGS. 8-14 illustrate integrated photonic packages having optical fibers integrated with optical engines through adapters in accordance with some embodiments.

FIG. 8 illustrates the package 84 formed in accordance with alternative embodiments. To allow enough space for waveguide 64 and lens 66, adapter 60 may include a portion extending lower. The package 84 in accordance with these embodiments includes adapter 60, which may be formed as a single piece, or may include two pieces integrated together. For example, adapter 60 may include a narrow lower portion and a wider upper portion bonded to the narrower lower portion, for example, through fusion bonding. Package component 20 thus may include recess/groove 21, with supporter 74 and the lower portion of adapter 60 extending into groove 21.

In accordance with some embodiments, the thicknesses (measured in the vertical direction) of waveguide 64 may be gradually reduced from lens 66 to the portion in region 80A. A portion of the waveguide 64 in region 80A may have a uniform dimension (the illustrated thickness) to allow for evanescent coupling. In accordance with some embodiments, waveguide 64 may be formed as being straight or at least less curved than in the embodiment as shown in FIG. 5. Since waveguide 64 is not bent, the light loss is reduced.

Figure 16:
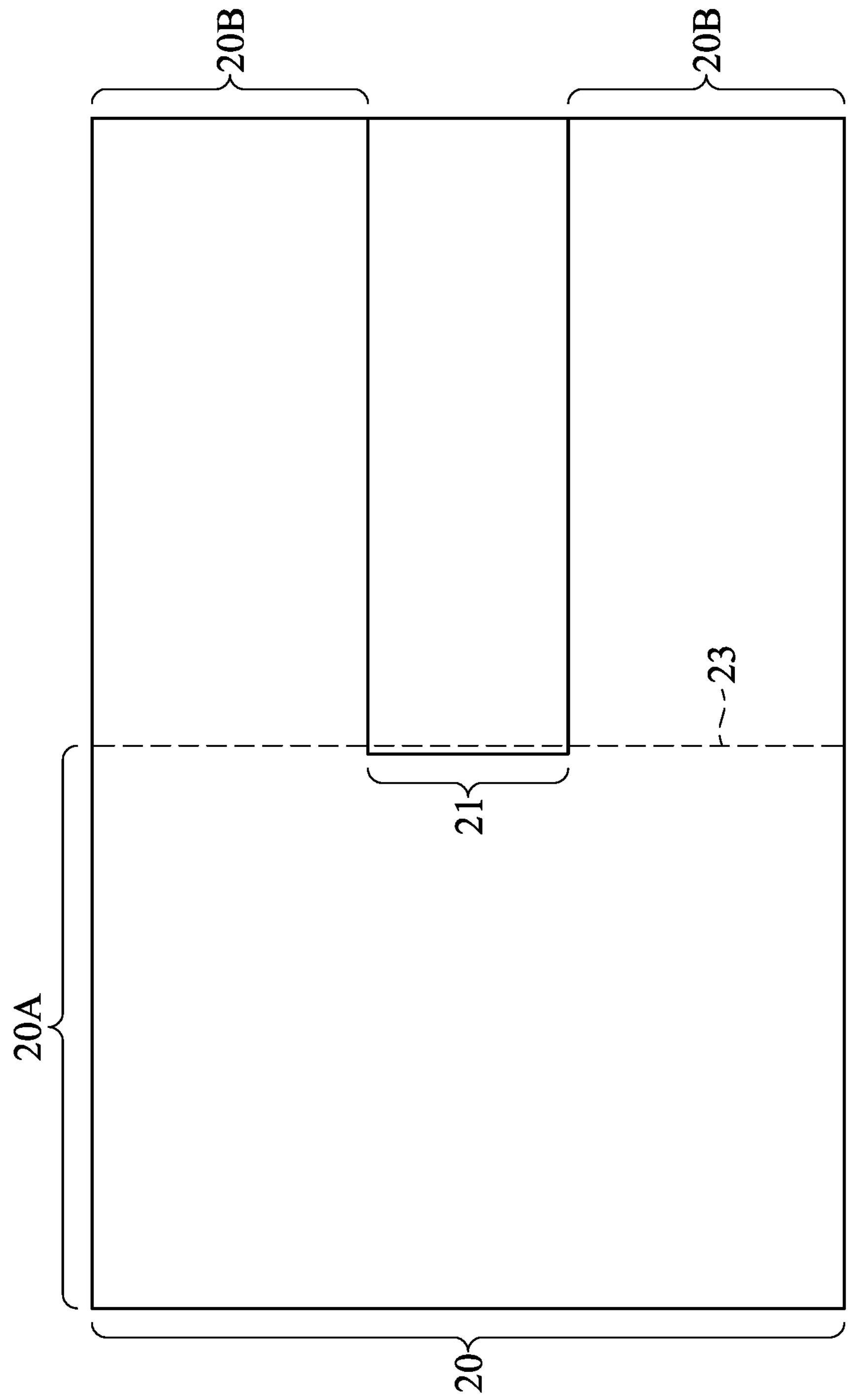
FIG. 16 illustrates a top view of a package component comprising a groove in accordance with some embodiments.

A top view of an example package component 20 having groove 21 is shown in FIG. 16. When viewed from the top of package component 20, the groove 21 extends to the right edge of package component 20, but is spaced apart from the illustrated top edge and bottom edge of package component 20 by portions 20B. Alternatively stated, groove 21 may be between two opposing parts 20B of package component 20, with the opposing parts 20B (and part 20A) not recessed. In accordance with alternative embodiments, the groove 21 may be as shown by the dashed line 23 in FIG. 16, wherein groove 21 extends to three edges (the top edge, the bottom edge, and the right edge) of package component 20.

Figure 9:
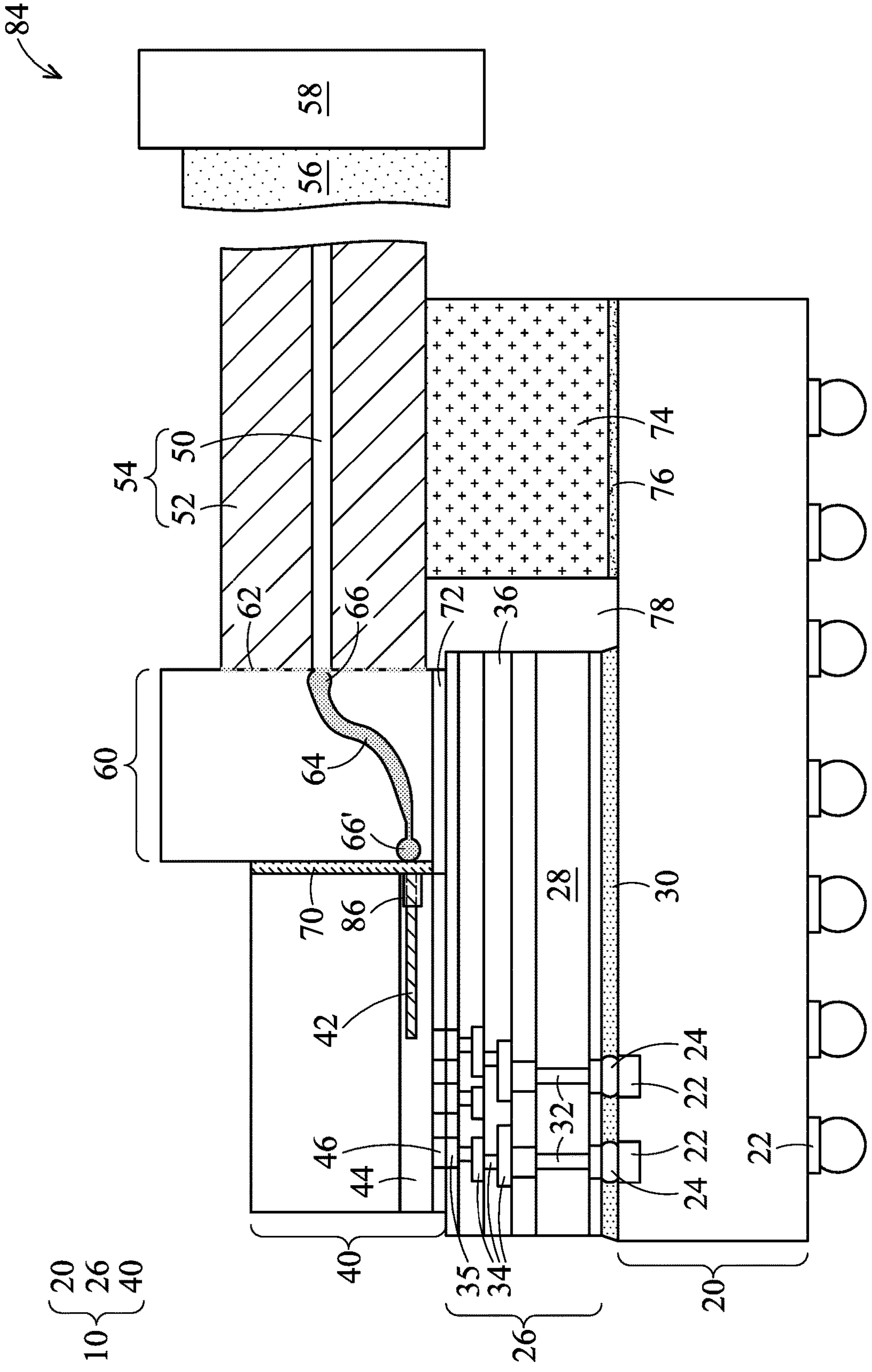

FIG. 9 illustrates the package 84 formed in accordance with alternative embodiments. The package 84 in accordance with these embodiments is similar to the embodiment as shown in FIG. 5, except that the light is projected into optical engine 40 directly from adapter 60, rather than going through the waveguide(s) in interposer 26. Optical engine 40 may include edge coupler 86, which may be connected to waveguide 42 in the PIC of optical engine 40, so that light may be passed into waveguide 42 through edge coupling. In the embodiments as shown in FIG. 9, lens 66' may be formed on the side of waveguide 64 facing edge coupler 86. Lens 66' may also be formed through laser writing.

Figure 10:
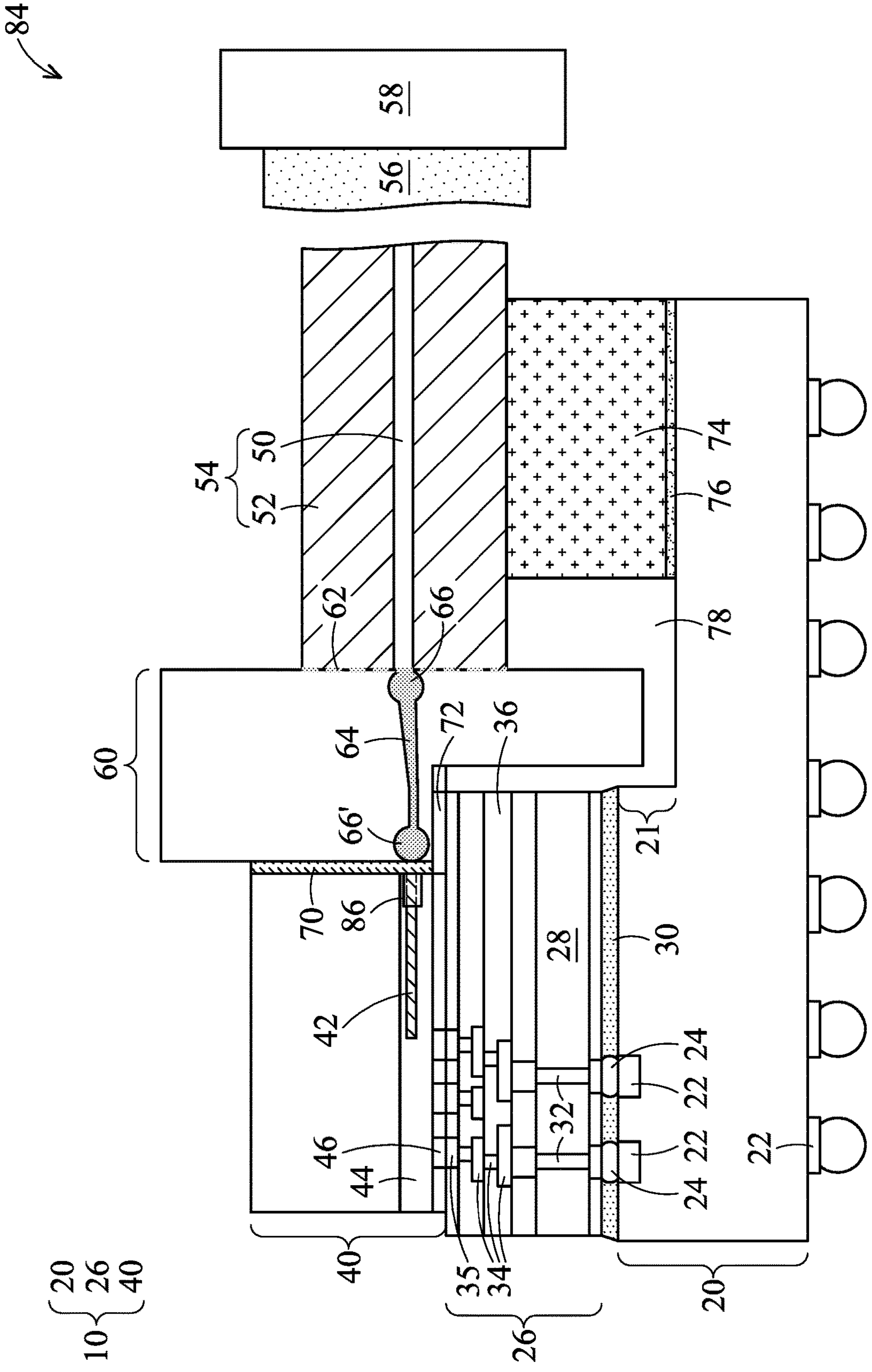
Figure 15:
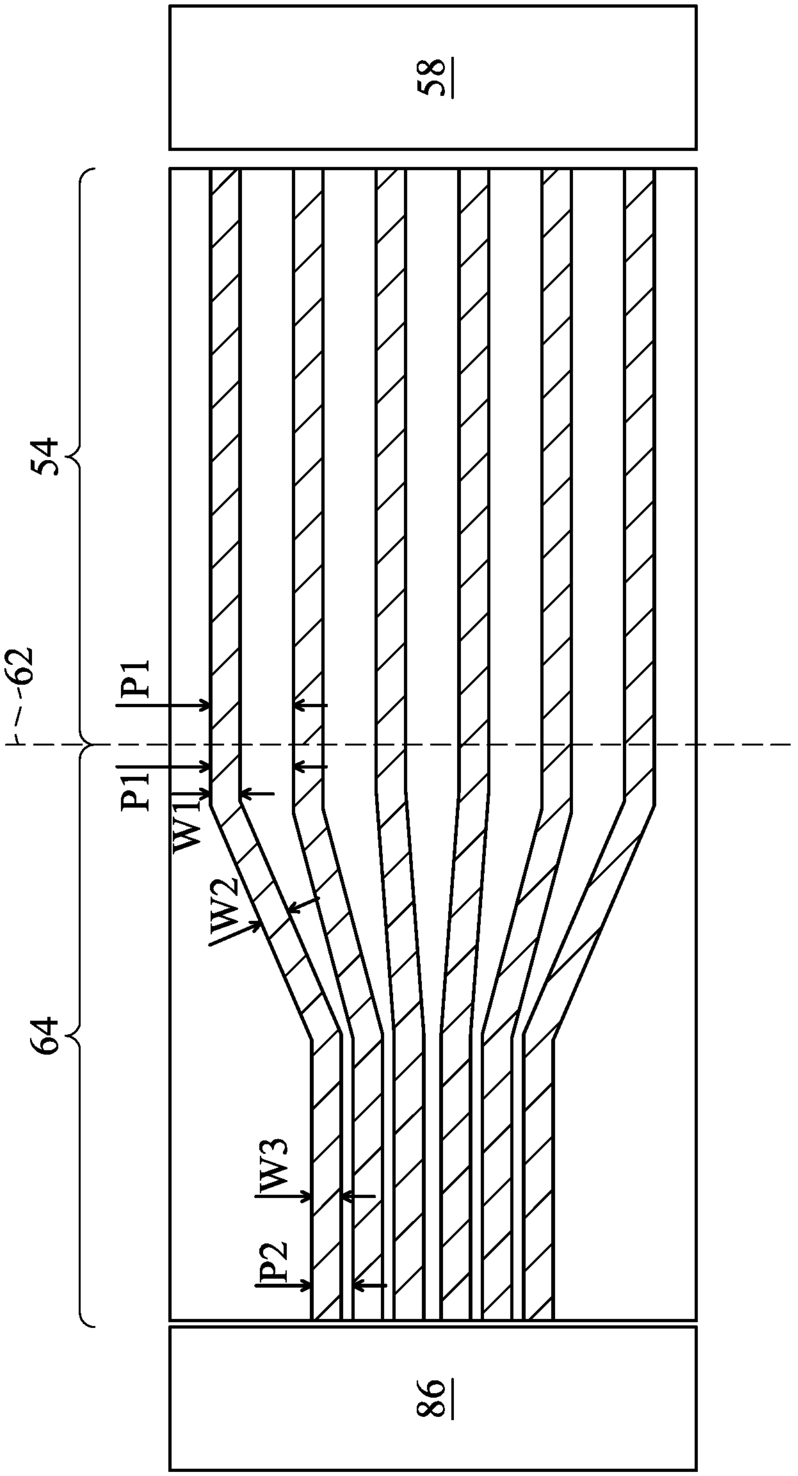
FIG. 15 illustrates a top view in the conversion of pitches in an adapter in accordance with some embodiments.

As addressed above, there may be a plurality of optical fibers 54. Accordingly, a plurality of laser written waveguides 64 and lens 66 may be formed, each corresponding to and optically coupling to one of optical fibers 54. FIG. 15 illustrates a top view of waveguides 64 relative to optical fibers 54 and edge coupler 86 in accordance with some embodiments. Lenses 66 and 66' are not illustrated, while they may be formed. A plurality of optical fibers 54 are placed, with the optical fibers 54 having pitch P1. Edge coupler 86 may include a plurality of channels, each optically connected to one of waveguides 42 (FIG. 10).

Waveguides 64 may also have pitch P1 at the ends facing optical fibers 54, and pitch P2 at the ends facing edge coupler 86. Pitch P2 is smaller than pitch P1. For example, pitch P1 may be in the range between about 120 μm and about 300 μm, and pitch P2 may be in the range between about 10 μm and about 100 μm. The ratio P2/P1 may be in the range between about 2 and about 10 in accordance with some embodiments.

Also, the widths of waveguides 64 may be reduced from the ends facing optical fibers 54 to the ends facing edge coupler 86. For example, several widths W1, W2, W3 are marked in FIG. 15. In accordance with some embodiments, width W2 is equal to or smaller than width W1, and/or width W3 is equal to or smaller than width W2. From the position of width W1 to the position of width W2, the widths of waveguide 64 may be continuously reduced, and/or from the position of width W2 to the position of width W3, the widths of waveguide 64 may be continuously reduced. Also, although not shown, the entireties of waveguides 64 may be continuously curved with no abrupt turns to reduce light loss.

It is appreciated that if evanescent coupling (for example, in the embodiments as shown in FIGS. 5 and 8) rather than edge coupling is used, the embodiments as shown in FIG. 15 may also apply, except that instead of using edge coupler 86, a plurality of waveguides 38 will extend to directly underlying the illustrated left ends of waveguides 64, as shown in FIGS. 6 and 7, with the left end of each of waveguides 64 overlapping the right end of one of waveguides 38.

FIG. 10 illustrates the package 84 formed in accordance with alternative embodiments. The package 84 in accordance with these embodiments is similar to the embodiment as shown in FIG. 9, except that waveguide 64 is formed as being straight in the illustrated cross-section. The light is projected into optical engine 40 directly from adapter 60, rather than going through the waveguide(s) in interposer 26. Optical engine 40 may include edge coupler 86, which may be connected to waveguide 42 in the PIC of optical engine 40, so that light may be passed into waveguide 42 through edge coupling. In the embodiments as shown in FIG. 10, lens 66' may also be formed on the side of waveguide 64 facing edge coupler 86, and lens 66' may also be formed through laser writing.

Also, package component 20 may include groove 21 for supporter 74 and the lower portion of adapter 60 extending into. The top view of package component 20 and the corresponding groove 21 may be similar to what are discussed referring to FIG. 16.

Figure 11:
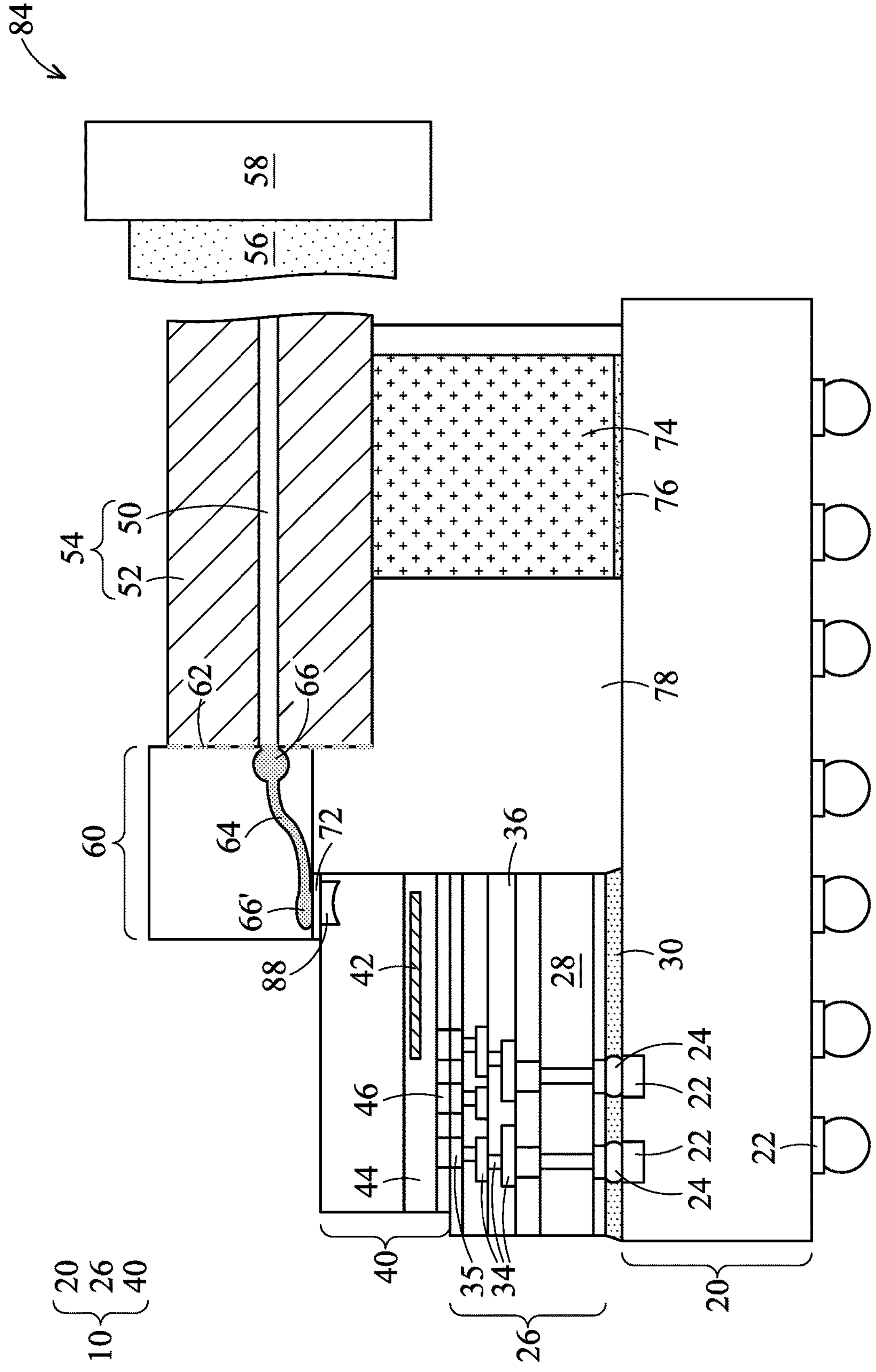

FIG. 11 illustrates the package 84 formed in accordance with alternative embodiments. The package 84 in accordance with these embodiments has light being coupled into optical engine 40 from the top of optical engine 40. In accordance with these embodiments, adapter 60 and the corresponding waveguide(s) 64 are over the top of optical engine 40. The light from optical fiber 54 is focused by lens 66', and is projected into lens 88 in optical engine 40. The light may then be redirected, for example, through a grating coupler (not shown), and received by a waveguide in optical engine 40 for further transfer and processing.

Figure 12:
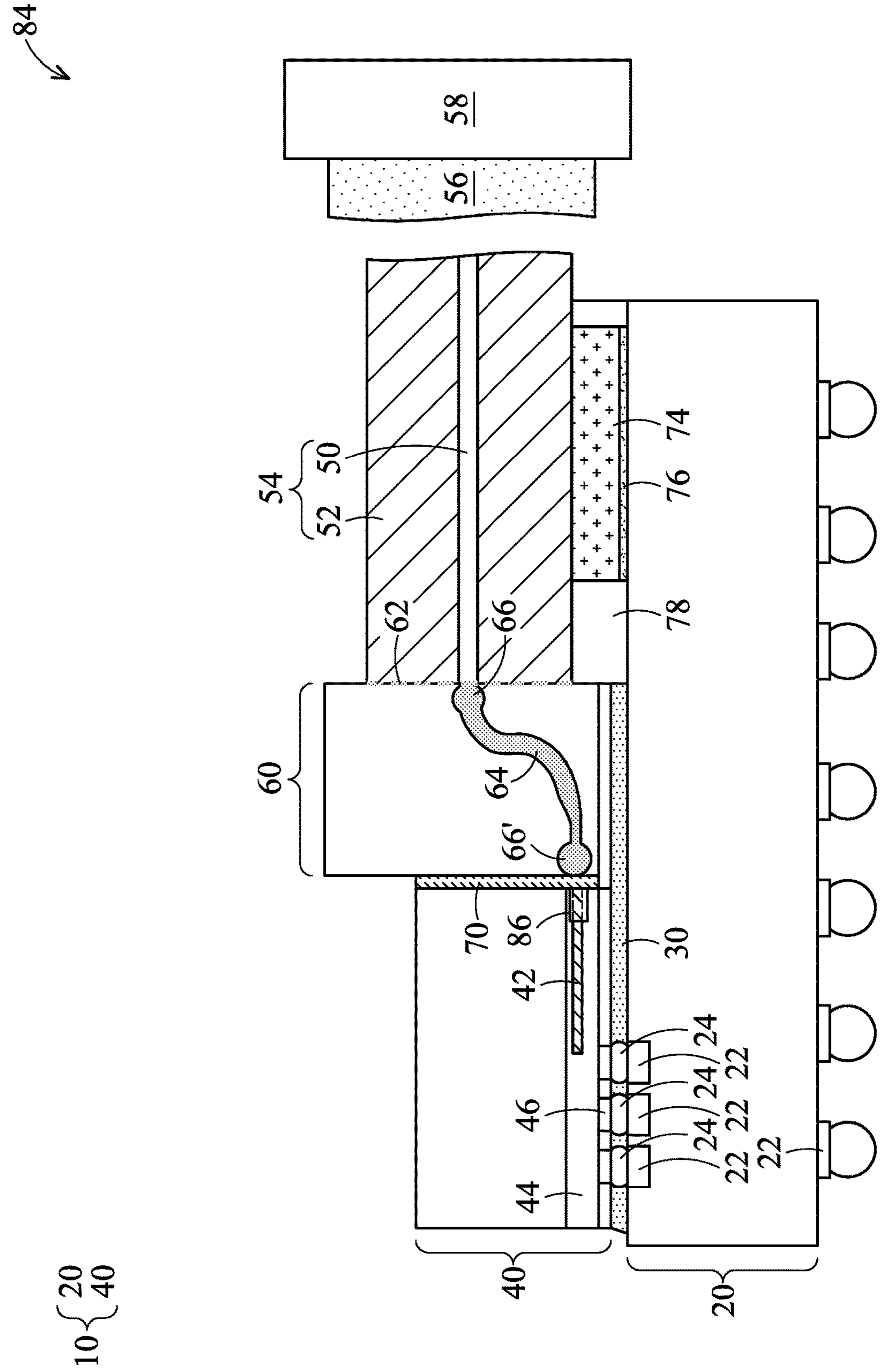

FIG. 12 illustrates the package 84 formed in accordance with alternative embodiments. The package 84 in accordance with these embodiments are similar to the embodiments as shown in FIG. 9, except that optical package 84 does not include interposer 26. Optical engine 40 is bonded directly to package component 20. In accordance with these embodiments, no groove is formed in package component 26. Waveguide 64 may be curved to fit the positions of core 50 and edge coupler 86.

Figure 13:
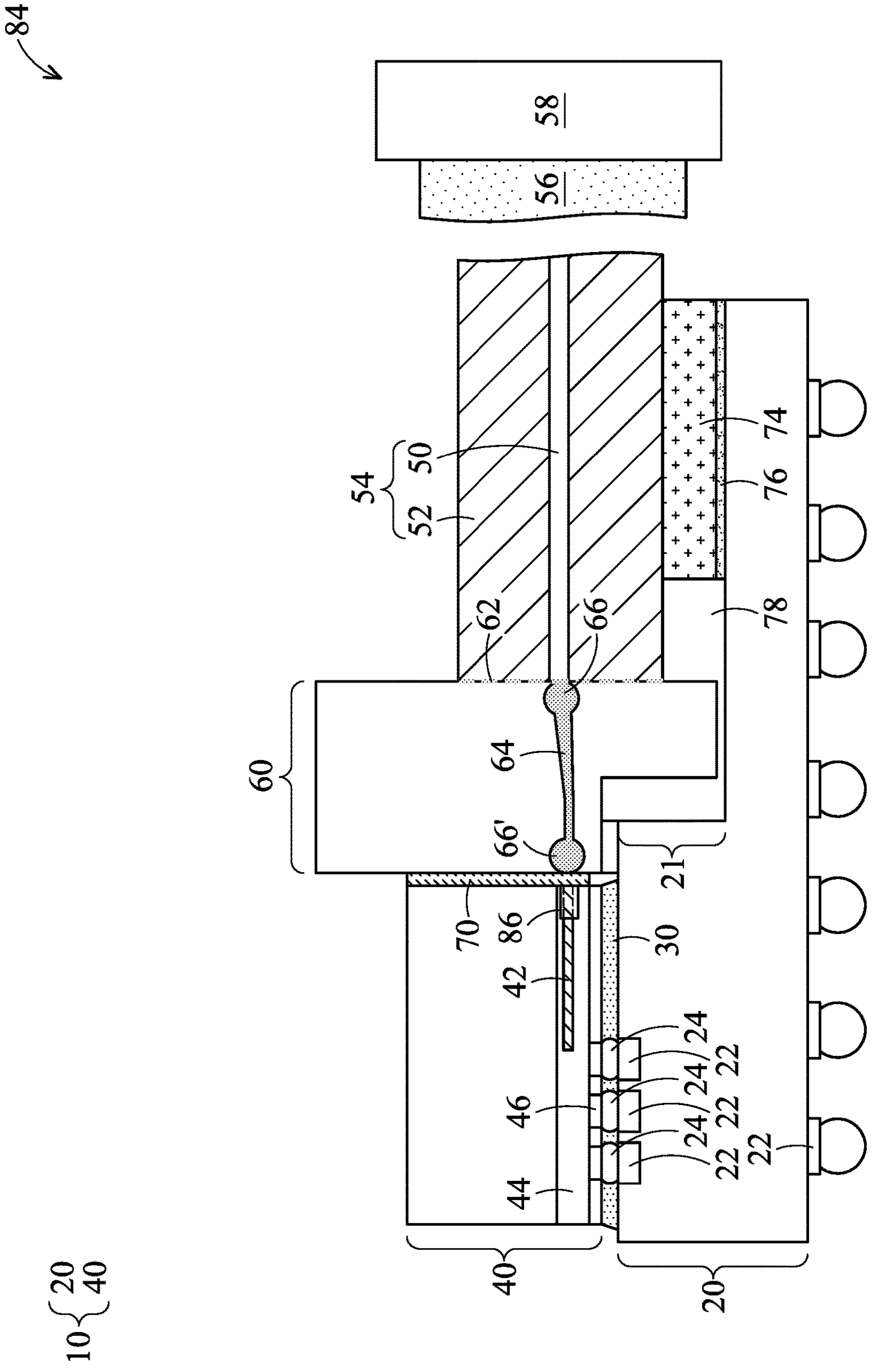

FIG. 13 illustrates the optical package 84 in accordance with alternative embodiments. The package 84 in accordance with these embodiments are similar to the embodiments as shown in FIG. 10, except that optical package 84 does not include interposer 26. Optical engine 40 is bonded directly to package component 20. In accordance with these embodiments, groove 21 is formed in package component 26, so that optical fiber 54 and adapter 60 may be placed lower. Waveguide 64 may thus be written as being straight to reduce light loss.

Figure 14:
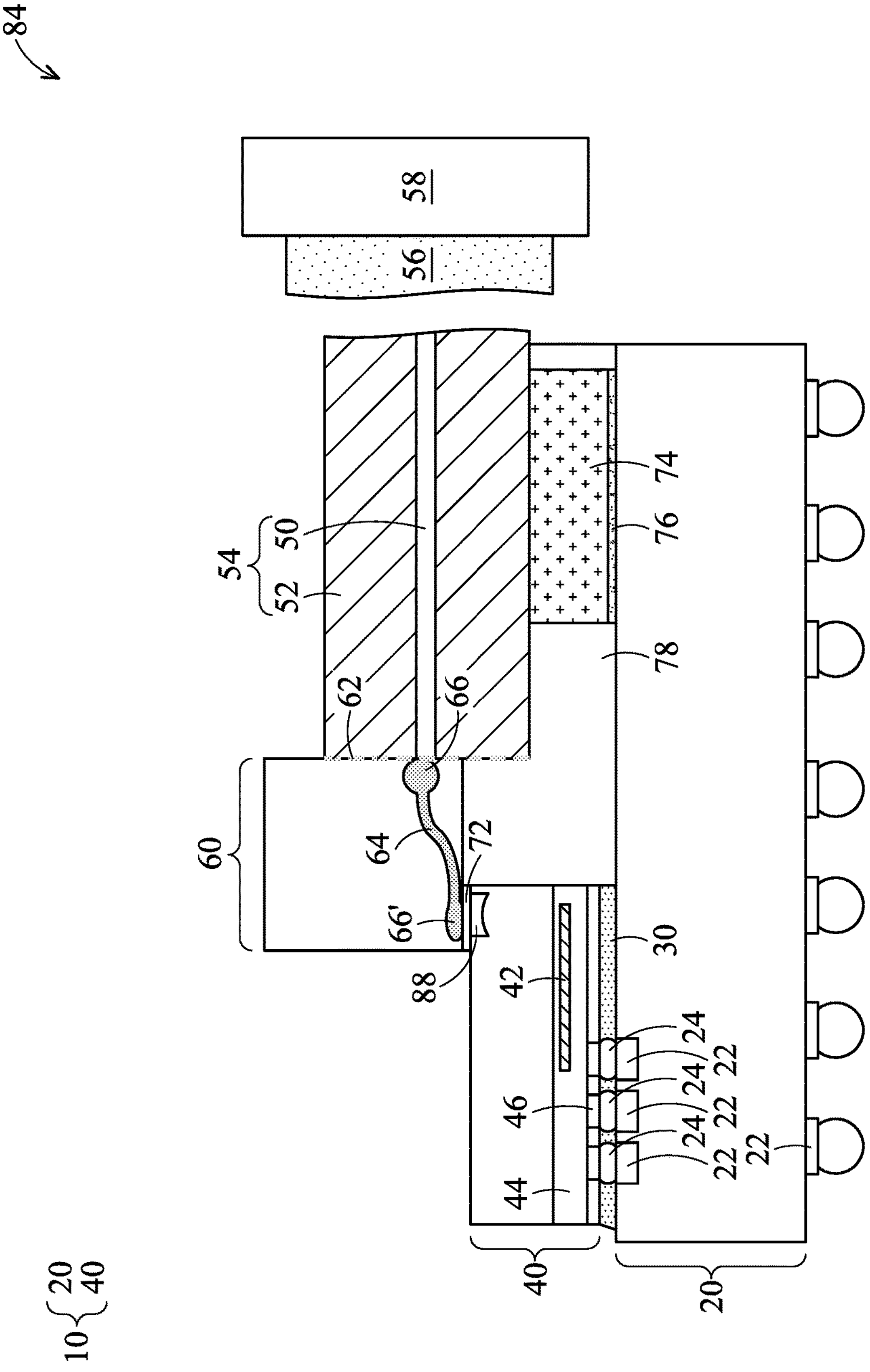

FIG. 14 illustrates the optical package 84 in accordance with alternative embodiments. The package 84 in accordance with these embodiments are similar to the embodiments as shown in FIG. 11, except that optical package 84 does not include interposer 26. In accordance with these embodiments, adapter 60 and the corresponding waveguide(s) 64 are over the top of optical engine 40. The light projected from optical fiber 54 is focused by lens 66', and is projected into lens 88 in optical engine 40. The light may then be redirected, for example, through a grating coupler (not shown), and received by a waveguide in optical engine 40 for further transfer and processing.

The embodiments of the present disclosure have some advantageous features. By forming adapters including laser written waveguides, optical fibers may be integrated with optical engines, with the adapters being used to adapt to the difference between the sizes and the pitches of the optical fibers and the sizes and the pitches of the optical components in the optical engines.

In accordance with some embodiments of the present disclosure, a method comprises forming an optical engine comprising a photonic integrated circuit die, wherein the photonic integrated circuit die comprises an optical component; forming an adapter comprising a laser written waveguide; and assembling the optical engine, the adapter, and an optical fiber as a package, wherein the optical fiber is optically coupled to the optical component through the laser written waveguide in the adapter. In an embodiment, the method further comprises attaching the optical fiber to a transparent block; and after the optical fiber is attached to the transparent block, writing the laser written waveguide in the transparent block to form the adapter.

In an embodiment, the method further comprises writing the laser written waveguide in the transparent block to form the adapter, wherein the optical fiber is attached to the adapter after the laser written waveguide is written. In an embodiment, the method further comprises attaching the adapter to an interposer, wherein the interposer comprises a first waveguide, and the laser written waveguide is optically coupled to the first waveguide through evanescent coupling; and bonding the optical engine to the interposer, wherein the optical engine comprises a second waveguide, and the first waveguide is optically coupled to the second waveguide through evanescent coupling. In an embodiment, the optical component in the optical engine comprises an edge coupler, and wherein the laser written waveguide is optically coupled to the edge coupler. In an embodiment, the adapter comprises a portion overlapping the optical engine, and the laser written waveguide comprises a first lens, and the first lens is aligned to a second lens in the optical engine.

In an embodiment, the method further comprises attaching a package component to the optical engine and the adapter, wherein the package component comprises a groove, and the adapter comprises a portion extending into the groove. In an embodiment, the method further comprises attaching a supporter underlying and supporting the optical fiber. In an embodiment, the laser written waveguide is curved in the adapter. In an embodiment, the laser written waveguide is straight in a cross-section view of the adapter. In an embodiment, the adapter further comprises a laser written lens joined to the laser written waveguide, wherein the laser written lens is between the laser written waveguide and the optical fiber.

In accordance with some embodiments of the present disclosure, a package comprises an optical engine comprising a photonic integrated circuit die, wherein the photonic integrated circuit die further comprises an optical component; an adapter comprising a laser written waveguide, wherein a first end of the laser written waveguide is optically coupled to the optical component; and an optical fiber aligned to a second end of the laser written waveguide. In an embodiment, the optical component comprises a first waveguide, and the package further comprises an interposer comprising a second waveguide, wherein the first waveguide and the second waveguide are configured to be optically coupled through evanescent coupling, and the second waveguide and the laser written waveguide are configured to be optically coupled through evanescent coupling.

In an embodiment, the optical component comprises an edge coupler aligned to the first end of the laser written waveguide. In an embodiment, the package further comprises a package component, with the optical engine and the optical fiber being attached to the package component, wherein the adapter extends into a groove in the package component. In an embodiment, the package further comprises a package component; and a supporter on the package component and supporting the optical fiber. In an embodiment, the package comprises a plurality of laser written waveguides in the adapter, wherein the laser written waveguides have first ends having a first pitch, and second ends having a second pitch greater than the first pitch, with the laser written waveguide being among the plurality of laser written waveguides.

In accordance with some embodiments of the present disclosure, a package comprises a package substrate; an interposer over and bonding to the package substrate; an optical engine over and bonding to the interposer; an adapter attached to the interposer, wherein the adapter comprises a laser written waveguide; and an optical fiber attached to the package substrate, wherein the optical fiber is optically coupled to the optical engine through the laser written waveguide and the interposer. In an embodiment, the interposer comprises a first waveguide, and the optical engine comprises a second waveguide, and wherein the first waveguide is optically coupled to both of the laser written waveguide and the second waveguide through evanescent coupling. In an embodiment, the laser written waveguide is curved.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

forming an optical engine comprising a photonic integrated circuit die, wherein the photonic integrated circuit die comprises an optical component;

forming an adapter comprising:

a laser written waveguide; and a laser written lens joined to the laser written waveguide; and assembling the optical engine, the adapter, and an optical fiber as a package, wherein the laser written lens is between the laser written waveguide and the optical fiber, wherein the optical fiber is optically coupled to the optical component through the laser written waveguide in the adapter.

2. The method of claim 1 further comprising:

attaching the optical fiber to a transparent block; and after the optical fiber is attached to the transparent block, writing the laser written waveguide in the transparent block to form the adapter.

3. The method of claim 2, wherein the optical fiber is attached to the adapter after the laser written waveguide is written.

4. The method of claim 1 further comprising:

attaching the adapter to an interposer, wherein the interposer comprises a first waveguide, and a first end portion of the laser written waveguide overlaps a second end portion of the first waveguide; and bonding the optical engine to the interposer, wherein the optical engine comprises a second waveguide, and the first waveguide is optically coupled to the second waveguide through evanescent coupling.

5. The method of claim 1, wherein the optical component in the optical engine comprises an edge coupler, and wherein the laser written waveguide is optically coupled to the edge coupler.

6. The method of claim 1, wherein the adapter comprises a portion overlapping the optical engine, and the laser written waveguide comprises a first lens, and the first lens is aligned to a second lens in the optical engine.

7. The method of claim 1 further comprising attaching a package component to the optical engine and the adapter, wherein the package component comprises a groove, and the adapter comprises a portion extending into the groove.

8. The method of claim 1 further comprising attaching a supporter underlying and supporting the optical fiber.

9. The method of claim 1, wherein the laser written waveguide is curved in the adapter.

10. The method of claim 1, wherein the laser written waveguide is straight in a cross-section view of the adapter.

11. A package comprising:

an optical engine comprising a photonic integrated circuit die, wherein the photonic integrated circuit die further comprises an optical component;

an adapter comprising:

a laser written waveguide, wherein a first end of the laser written waveguide is optically coupled to the optical component; and a lens joined to the laser written waveguide; and an optical fiber aligned to a second end of the laser written waveguide, wherein the laser written lens is between the laser written waveguide and the optical fiber.

12. The package of claim 11, wherein the optical component comprises a first waveguide, and the package further comprises:

an interposer comprising a second waveguide, wherein the first waveguide and the second waveguide are configured to be optically coupled through evanescent coupling, and the second waveguide and the laser written waveguide are configured to be optically coupled through evanescent coupling.

13. The package of claim 11, wherein the optical component comprises an edge coupler aligned to the first end of the laser written waveguide.

14. The package of claim 11 further comprising a package component, with the optical engine and the optical fiber being attached to the package component, wherein the adapter extends into a groove in the package component.

15. The package of claim 11 further comprising:

a package component; and a supporter on the package component and supporting the optical fiber.

16. The package of claim 11 comprising a plurality of laser written waveguides in the adapter, wherein the laser written waveguides have first ends having a first pitch, and second ends having a second pitch greater than the first pitch, with the laser written waveguide being among the plurality of laser written waveguides.

17. A package comprising:

a package substrate;

an interposer over and bonding to the package substrate;

an optical engine over and bonding to the interposer;

an adapter attached to the interposer, wherein the adapter comprises a laser written waveguide;

an optical fiber attached to the package substrate, wherein the optical fiber is optically coupled to the optical engine through the laser written waveguide and the interposer; and an optical glue between the adapter and the optical engine, wherein the optical glue is configured to allow optical signals to be transferred between the optical engine and the adapter through the optical glue.

18. The package of claim 17, wherein the interposer comprises a first waveguide, and the optical engine comprises a second waveguide, and wherein the first waveguide is optically coupled to both of the laser written waveguide and the second waveguide through evanescent coupling.

19. The package of claim 17, wherein the adapter further comprises a laser written lens joined to the laser written waveguide.

20. The package of claim 19, wherein the laser written lens is between the laser written waveguide and the optical fiber.

* * * * *